Oct. 28, 1941.  P. A. THOMASSET  2,260,729
PIGMENT TESTING DEVICE
Filed March 2, 1939  2 Sheets-Sheet 2
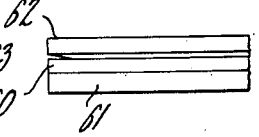
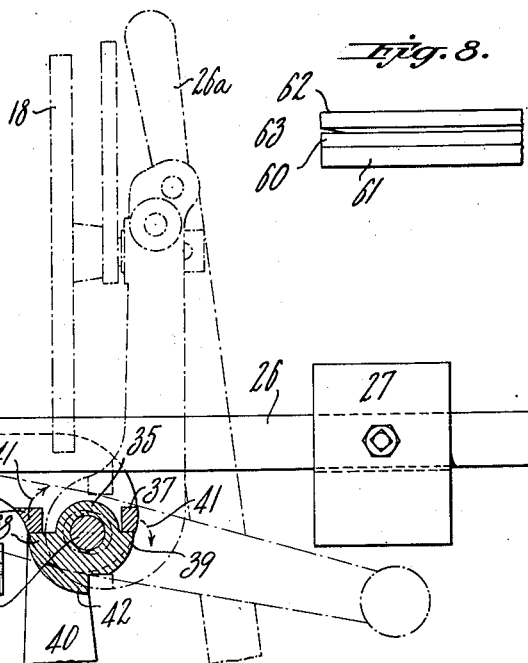
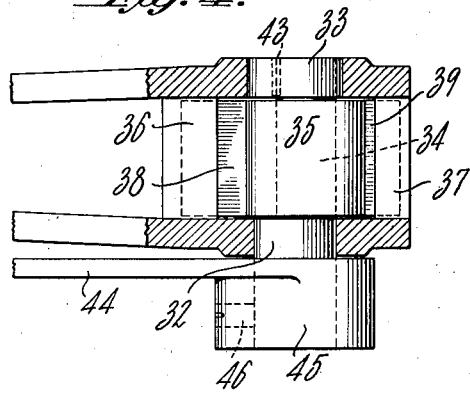
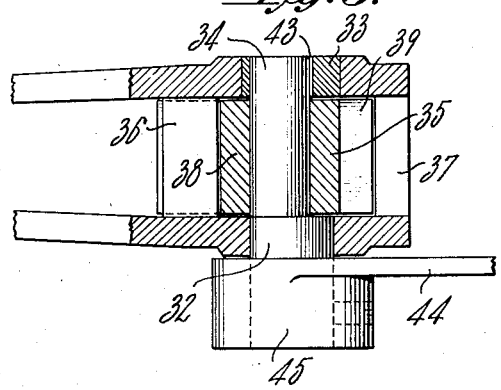
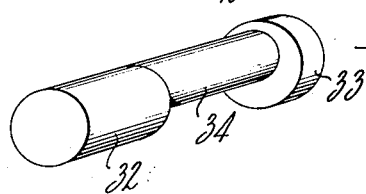
INVENTOR.
PAUL A. THOMASSET
BY Charles J. Holland
ATTORNEY.

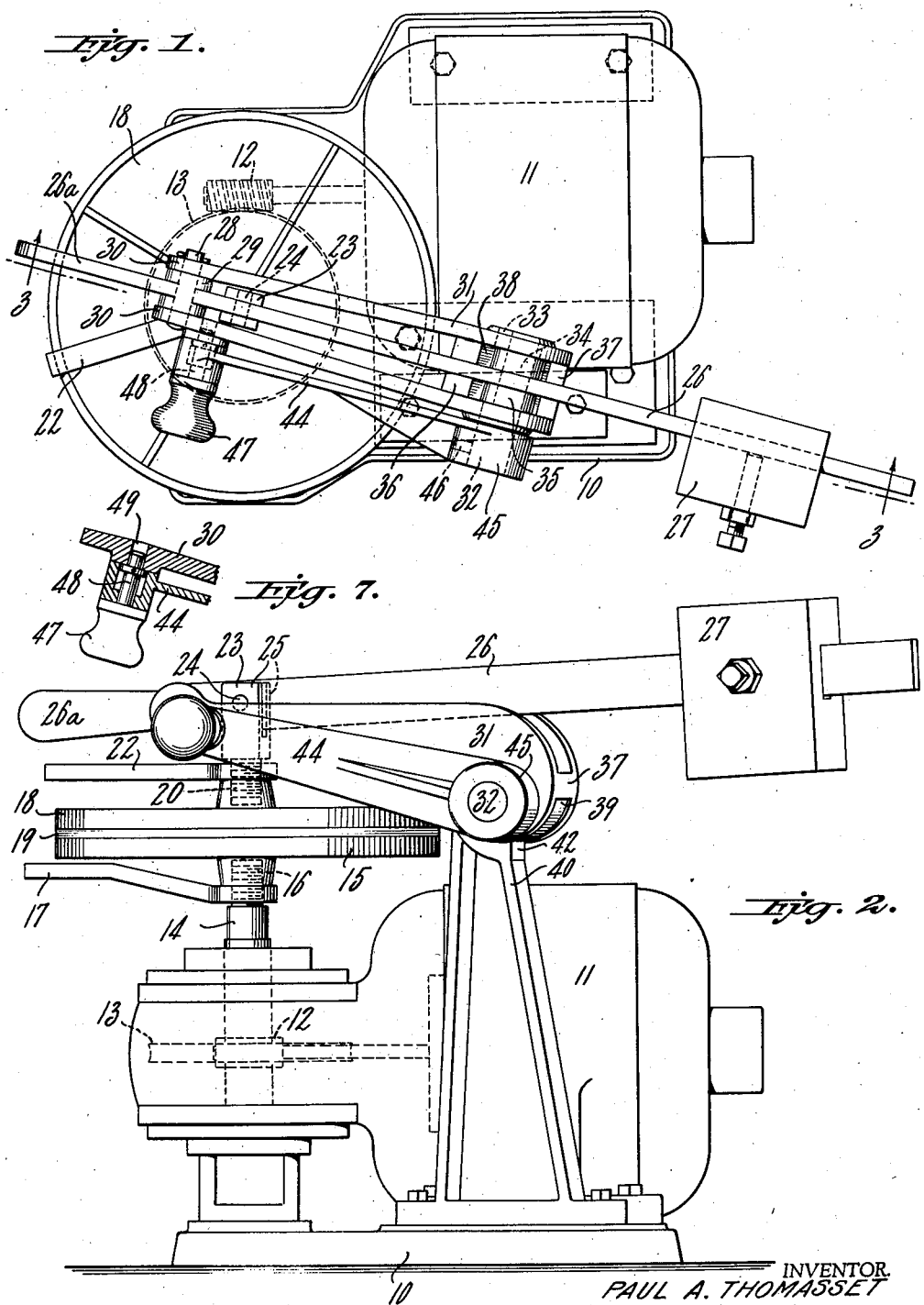

Patented Oct. 28, 1941

2,260,729

UNITED STATES PATENT OFFICE 2,260,729

PIGMENT TESTING DEVICE

Paul A. Thomasset, St. George, Staten Island, N. Y., assignor to Ansbacher Siegle Corporation, Brooklyn, N. Y., a corporation of New York Application March 2, 1939, Serial No. 259,491

3 Claims. (Cl. 83—22)

This invention relates to the testing of pigments and is particularly concerned with the problem of mixing and grinding small quantities of pigments and oils in order to produce smooth and uniformly blended pastes which can be tested and compared with a standard pigment. By this means the properties of mass color (sometimes called self color or overtone), tinting strength, hiding power, etc., may be accurately determined and the pigment compared with established standards.

This testing procedure is of great importance to the manufacturer and sometimes the users of pigments. However, it has heretofore been difficult to obtain a uniform mixture of oil and pigment in the case of each sample tested. That is, although a given sample may be mixed and ground and give what appears to be a complete and proper blend, another portion of the same sample when mixed a second time does not always give the same appearance and qualities obtained in the case of the first. This is because of a difference in the amount of work performed in the mixing and grinding of each sample, the amount of pressure used during the operation and the time during which each sample was subjected to the mixing treatment.

These variables are difficult to control, particularly when a hand muller is used for the mixing operation. This consists of a pestle-shaped glass member which rubs the ingredients on a ground glass plate. It is very difficult to insure that the operator will perform the proper number of mulls to blend the ingredients and bring out the tone of the color to be tested, and to insure that each test is carried out with the same amount of pressure and for the same length of time.

The use of a roll mill similar to an ink grinding machine has been suggested to overcome these difficulties. This consists of three cylindrical rollers revolving in opposite directions at differential speeds which exert a shearing action on the particles somewhat analogous to the hand mulling operation. Mulling by this means requires a considerable quantity of material which is not always available, and in addition the adjustment of the mill depends a great deal on the skill of the operator which varies with different operators. The slightest change in clearance between rollers results in a considerable change in the product.

Mulling machines provided with a small disk rotating in a circular path around a plate have also been tried in an endeavor satisfactorily to solve the problem of proper mixing for testing. This type of machine, however, is objectionable in that, although the pressure exerted on the plate is constant, the treated material which extends over a relatively large portion of the disk tends to become swept over to the edges of the grinding plate and, therefore, the full quantity of material does not receive a uniform grinding action. Due to this unknown factor, tests of separate samples of material are not comparable. Furthermore, due to its design, this type of machine cannot exert sufficient pressure to mixtures of relatively heavy consistency, and in such cases the result of mixing is unsatisfactory.

I have devised a machine that overcomes the disadvantages of the prior art. This comprises briefly a pair of disks, one fixed and the other rotating about a fixed axis in a horizontal plane, between which a test sample of pigment may be uniformly rubbed. I provide adjustable means for regulating the pressure between the disks, under which pressure the oil and pigment quickly unite into a paste that expands to a thin film covering only a portion of the disks, obviating the disadvantage of having excess material accumulate around the edges thereof. The pressure between the disks is uniform and can be reproduced exactly at all times so that a given material is always ground under the same pressure. I have also provided means by which the disks may be easily separated without moving the driving motor, and held apart a sufficient distance so that access to each disk is readily obtainable.

Details of the invention will more clearly appear when reference is had to the accompanying drawings in which Fig. 1 is a plan view of my novel mulling apparatus; Fig. 2 is a side elevation thereof; Fig. 3 is a fragmentary view showing portions of Fig. 2 partly in elevation and partly in section, the sections being taken along the line 3—3 of Fig. 1; Figs. 4 and 5 are fragmentary horizontal sections adjacent the pivot portion of the plate-separating means; Fig. 6 is a perspective view of the eccentric pin or cam shaft associated with such pivot; Fig. 7 is a partial section of the locking device shown in plan in Fig. 1; and Fig. 8 is a fragmentary side elevation of an alternative form of the operating disks.

As shown in Figs. 1 and 2, the device may satisfactorily comprise a base 10 on which is mounted a gear-head motor 11 having a worm 12, worm wheel 13 and counter shaft 14, on which latter a rotatable metal disk 15 is secured as by threads 16. For locking the disk on the shaft and releasing it therefrom, a lock arm 17 is screwed on the threaded portion 16 of shaft 14. The disk 15 is rotatable by means of the instrumentalities shown and grinds and mixes a pigment and oil sample placed thereon by rubbing the same between it and metal disk 18 which is fixed. Between disks 15 and 18 I find it expedient to interpose a glass disk 19 which may be affixed to either metal disk. As shown, glass disk 19 is fixed in suitable manner to the upper or stationary disk 18 which is held in spaced relation to pedestal 40 through the instrumentalities now to be described.

Disk 18 is mounted on stub shaft 20, as by screw threads, and is locked in place by a lock arm 22 also threaded to the shaft 20. Stub shaft 20 is integrally formed with a yoke 23 suspended on pin 24 which extends through the ears 25 of the yoke and an opening drilled through lever 26 which is provided with a handle 26ª. The outer end of lever 26 is provided with an adjustable weight 27, and the inner end adjacent the handle is pivoted on pin 28 which extends through a boss 29 on lever 26. Pin 28 is journalled in the prongs 30 of forked member 31 and serves as a fulcrum for the lever 26.

This forked member 31 carries two prongs 30 that are connected together at their lower ends by cross bars 36 and 37. It is pivoted on the eccentric portions 32 and 33 of shaft 34. This shaft, shown in perspective in Fig. 6, is journalled in bearing 35 of pedestal 40. The eccentric portions act as cams so that when shaft 34 is turned by the means hereinafter to be described, the member 31 rides up on the cams 32 and 33. This moves cross bars 36 and 37 away from and out of engagement with stops 38 and 39 of the pedestal, in the general direction of the arrows 41 shown in dotted lines in Fig. 3. Fig. 4 shows the starting position and Fig. 5 shows the forked member moved over by the cams as shaft 34 is turned so that the bar 37 clears stop 39.

Forked member 31 is mounted in place by positioning it astraddle bearing 35 and inserting shaft 34 so that it extends through the base portions of the prongs of the fork and the bearing 35. Member 33 which is in the form of an eccentric collar having the same eccentricity as cam 32, is slipped over the end of shaft 34 and fixed in place by a spline 43 (see Figs. 4 and 5).

Shaft 34 is turned by a crank 44 having a collar 45 fixed to the cam portion 32 of shaft 34 as by set screw 46, the parts being adjusted so that they take an initial position as shown in full lines in Figs. 1, 2 and 3.

The end of crank 44 carries a handle 47 having a pin 48 adapted to fit in recess 49 of the near side prong 30. This construction is shown in detail in Fig. 7.

Fig. 8 shows a form of disk structure in which glass disk 60 is affixed to the rotary disk 61 and the fixed disk 62 is slightly beveled at 63 in order to facilitate separation of the plates.

In operation the desired oil and pigment sample is placed on the rotating plate 15 and the handle 26ª of lever 26 and handle 47 of crank 44 are brought down from the dot and dash position shown in Fig. 3 to the full line position shown in Figs. 1, 2 and 3. Pin 48 on handle 47 is moved from the "out" to the "in" position shown in Fig. 7 so that it enters recess 49 of prong 30. This locks the device in position, as forked member cannot move past stops 38 and 39. The weight 27 is then adjusted to exert the desired pressure on the fixed plate 18 through yoke 23 and stub shaft 20, the pin 28 serving as a fulcrum. The device is then set into operation, preferably by an automatic switch (not shown) operable as the device is locked, and the mixing and grinding of the sample begun at a suitable speed, say 85 R. P. M.

Suitable means (not shown) are provided to open the motor circuit when the required amount of work has been done on the sample batch. This may be accomplished by the use of a time switch which opens the circuit after a predetermined time has elapsed from the commencement of the operation.

In this way succeeding samples can be subjected to identical conditions of pressure and time, with the result that the mixed batch is truly representative of the characteristics of the mixture with the elimination of variables that heretofore could not be avoided.

After the mixing is complete and the motor stopped, the operator grasps handle 47 with his right hand, pulls out pin 48 and pushes crank 44 upward and backward toward the dot and dash position shown in Fig. 3. Then, he grasps handle 26ª of lever 26 with his left hand and pushes the same toward the dot and dash line position shown for this member. As crank 44 turns, it turns shaft 34 in its bearing 35, the cam portions 32 and 33 thereby lifting forked member 31 upwardly and away from stops 38 and 39 as previously described until cross bars 37 and 38 can rotate clear of the stops on the upper part of the pedestal. When the crank 44 has been turned 180°, the member 31 is turned approximately 90°, the cross bar 37 thereof coming to rest against stop 42 on pedestal 40. In this position the disks are readily accessible to the operator and may be cleaned, removed or substituted as desired.

What I claim is:

1. A device for mixing pigments and oils into uniform samples comprising a rotatable disk, a stationary disk disposed thereon in a frame, and pressure means comprising a weight adjustable on a lever so disposed in said frame as to press the stationary disk against the rotatable disk, and means comprising a shaft, cams on said shaft, and paired cranks pivoted on said cams adapted and arranged to bring said stationary disk into and out of operative position.

2. In a laboratory mulling device comprising an upper stationary disk and a lower rotatable disk having opposed smooth and flat surfaces, means for applying and adjusting pressure to said stationary disk against said rotatable disk, said means comprising a shaft, cams on said shaft, and paired cranks pivoted on said cams, said means being adapted and arranged to move said stationary disk into and out of operative position, and means associated with said cranks to lock said stationary disk and said cranks in operative position.

3. A laboratory device for mixing pigment samples for testing and comparison comprising a rotatable disk and a stationary disk having opposed smooth and flat surfaces, paired cranks pivoted on cams carried by a shaft and a lever fulcrumed on said paired cranks and adapted and arranged to apply pressure to said stationary disk, a weight disposed on said lever and adjustable thereon to vary the pressure of said stationary disk against said rotatable disk, said cam-bearing shaft and said paired cranks being adapted and arranged to bring said stationary disk into and out of operative position, and means acting through said crank structure and upon link elements connecting said lever and said shaft whereby said stationary disk and said lever lock in operative position.

PAUL A. THOMASSET.